Dec. 19, 1922.
E. L. STRAWN.
LAWN MOWER.
FILED JUNE 16, 1921.
1,439,583.
2 SHEETS—SHEET 2.
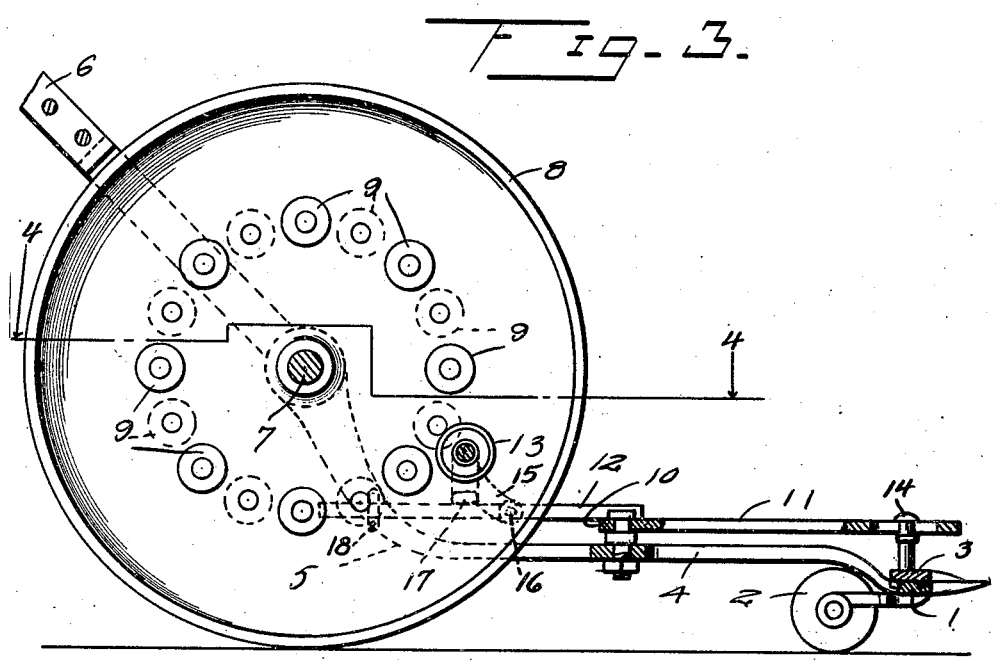
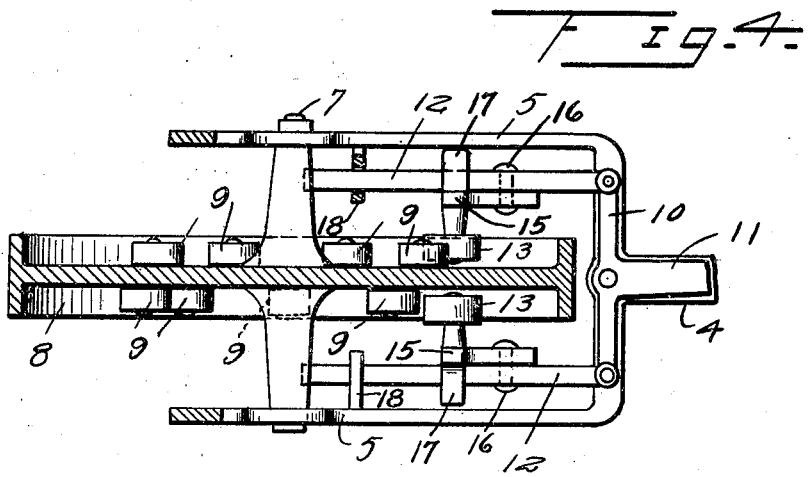
Inventor
E. L. Strawn

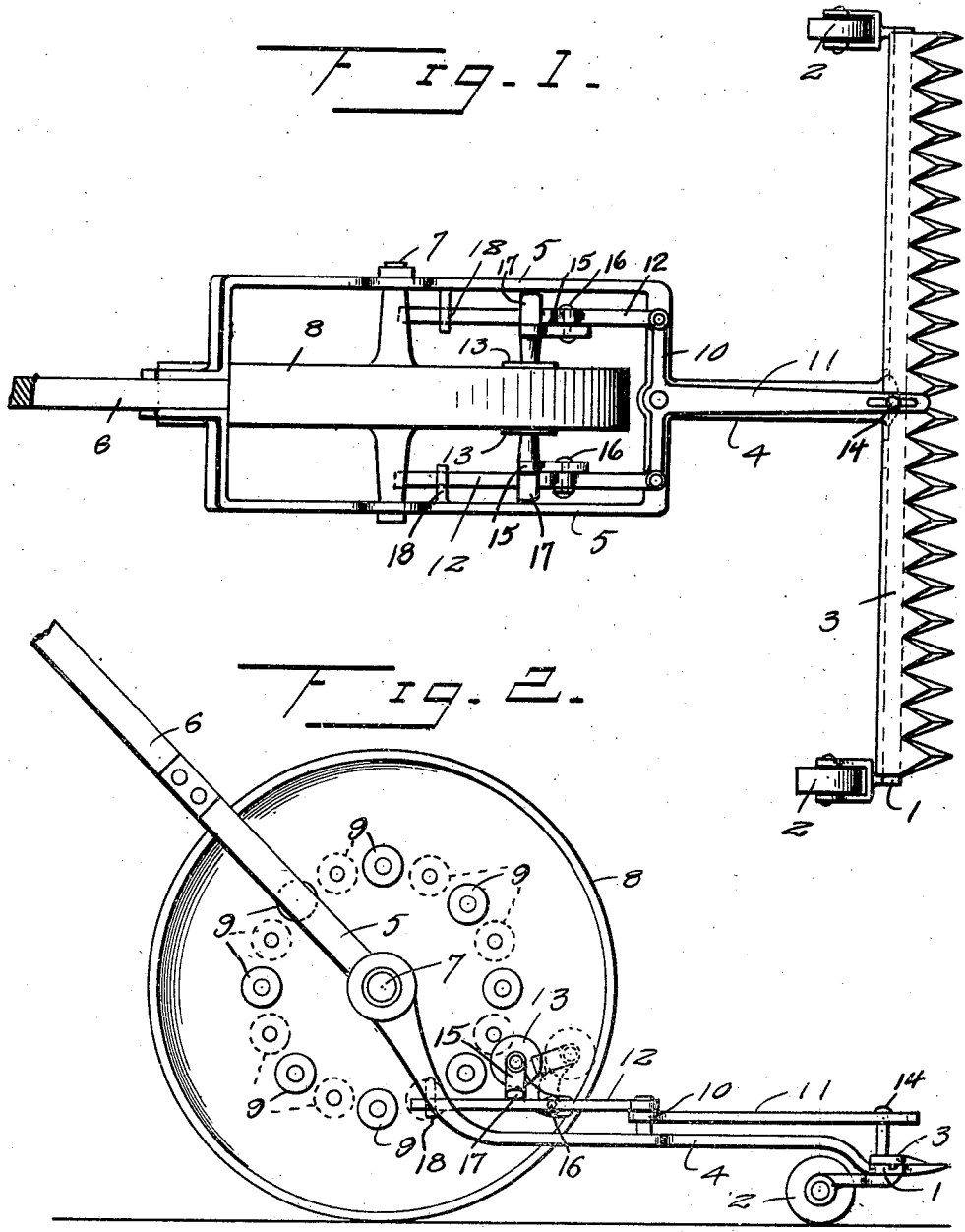

Patented Dec. 19, 1922.

1,439,583

UNITED STATES PATENT OFFICE.

ENOCH L. STRAWN, OF OMAHA, NEBRASKA.

LAWN MOWER.

Application filed June 16, 1921. Serial No. 478,046.

*To all whom it may concern:*

Be it known that I, ENOCH L. STRAWN, a citizen of the United States, residing at Omaha, in the county of Douglas and State of Nebraska, have invented certain new and useful Improvements in a Lawn Mower; and I do hereby declare the following to be a full, clear, and exact description of the invention, such as will enable others skilled in the art to which it appertains to make and use the same.

The invention provides a machine designed chiefly for cutting the grass of lawns and which is light, easily manipulated and efficient in operation and free from gearing with the result that it embodies a few number of parts which are readily accessible for any desired purpose such as for replacements, cleaning and oiling.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of a lawn mower embodying the invention.

Figure 2 is a side elevation thereof.

Figure 3 is a side view partly in section and with parts broken away, and

Figure 4 is a detail horizontal section on the line 4—4 of Figure 3.

Corresponding and like parts are referred to in the following description and designated in the several views of the drawings by like reference characters.

The machine embodies a finger bar 1 which is provided at opposite ends with supporting wheels 2. A sickle bar 3 is mounted upon the finger bar 1 to receive a reciprocatory movement. A bar 4 extends rearwardly from the finger bar 1 and is connected thereto at a central point. Arms 5 extend laterally, rearwardly and upwardly from the rear end of the bar 4 and have their upper rear ends brought together and secured to opposite sides of a handle bar 6. An axle 7 is mounted in the upwardly and rearwardly inclined portions of the arms 5 and support a broad tread ground wheel 8. Rollers are mounted upon opposite sides of the ground wheel 8 and are disposed in a circle and uniformly spaced. The rollers 9 upon one side of the wheel 8 alternate with the rollers upon the opposite side, this being essential to impart a reciprocatory movement to the sickle bar 3. A cross bar 10 is pivotally mounted intermediate its ends upon the rear portion of the bar 4 and a longitudinal bar 11 projects forwardly therefrom and engages a post 14 extending upwardly from the sickle bar 3. Bars 12 extend rearwardly from opposite ends of the cross bar 10 and are pivoted thereto and each is provided with a bracket 15 pivoted thereto at 16 and carrying a roller 13 which cooperates with the rollers 9 whereby in the operation of the machine the cross bar 10 has an oscillatory movement imparted thereto. The oscillatory movement of the cross bar 10 results in imparting a reciprocating movement to the sickle bar 3 through the instrumentality of the longitudinally disposed bar 11. The disposition of the part is such that backward movement of the machine automatically throws the driving mechanism out of gear so that the sickle bar 3 remains at rest. Forward movement of the machine results in imparting a reciprocating movement to the sickle bar 3 which cooperates with the finger bar 1 to cut the grass in a manner well understood. The cross bar 10 and the longitudinal bar 11 constitute in effect a T-shaped member. This is due to the pivotal connection of the brackets 15 with the bars 12 and the provision of extensions 17 projecting outwardly from the brackets and overlapping the said bars 12. Forward rotation of the wheel 8 causes the rollers 9 to engage the rollers 13 from above and hold the extensions 17 in contact with the bars 12 and the latter to move longitudinally. Backward rotation of the wheel 8 causes the rollers 9 to engage the rollers 13 from beneath and swing the brackets 15 upwardly on their pivots 16 without imparting any movement to the bars 12. Guides 18 project inwardly from the arms 5 and receive the rear ends of the bars 12.

Having thus described the invention, what I claim is:—

A lawn mower comprising a cutting mechanism, a handle bar member in cooperative relation therewith, a drive wheel supporting the handle bar member, rollers mounted upon opposite sides of the drive wheel and having an alternate arrangement and a member for imparting movement to the cutting mechanism and having portions extending along opposite sides of the drive wheel and adapted to be actuated by the rollers carried thereby.

In witness whereof I affix my signature in presence of witnesses.

ENOCH L. STRAWN.

Witnesses:
DANIEL L. JOHNSTON,
J. E. JOHNSTON,
LOUIS REYNOLDS.